United States Patent
Lee

(10) Patent No.: US 7,061,677 B2
(45) Date of Patent: Jun. 13, 2006

(54) SCREEN FOR PROJECTION DISPLAY IN WHICH THE LIGHT IS UNIFORMLY TRANSMITTED THROUGHOUT THE SCREEN

(75) Inventor: Jong-soo Lee, Chungcheongnam-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 35 days.

(21) Appl. No.: 10/890,388

(22) Filed: Jul. 14, 2004

(65) Prior Publication Data
US 2005/0057805 A1    Mar. 17, 2005

(30) Foreign Application Priority Data
Jul. 15, 2003 (KR) .................. 10-2003-0048428

(51) Int. Cl.
G03B 21/60 (2006.01)
G03B 21/56 (2006.01)

(52) U.S. Cl. .................. 359/457; 359/443; 359/460

(58) Field of Classification Search ........ 359/454–457, 359/443, 460
See application file for complete search history.

(56) References Cited

U.S. PATENT DOCUMENTS

| 3,580,661 A * | 5/1971 | Cooper, Jr. .................. 359/457 |
| 4,531,812 A * | 7/1985 | Oguino ........................ 359/457 |
| 4,773,731 A * | 9/1988 | Goldenberg et al. ........ 359/457 |
| 6,896,375 B1 * | 5/2005 | Peterson et al. ............... 353/66 |
| 2005/0046939 A1 * | 3/2005 | Yoshikawa et al. ......... 359/457 |

FOREIGN PATENT DOCUMENTS

| JP | 08-006164 A | 1/1996 |
| JP | 09-230509 A | 9/1997 |
| JP | 10-039419 A | 2/1998 |
| JP | 11-271884 A | 10/1999 |
| JP | 2000-180967 A | 6/2000 |
| KR | 2001-010330 A | 2/2001 |

* cited by examiner

Primary Examiner—W. B. Perkey
Assistant Examiner—Magda Cruz
(74) Attorney, Agent, or Firm—Sughrue Mion, PLLC

(57) ABSTRACT

A screen for a projection display is provided. The screen includes a Fresnel lens sheet which converges light emitted from a light source, and a lenticular lens sheet which disperses in a horizontal direction the light transmitted by the Fresnel lens sheet. The Fresnel lens sheet includes a first Fresnel lens on one surface and a second Fresnel lens on an opposite surface.

15 Claims, 7 Drawing Sheets

SCREEN FOR PROJECTION DISPLAY IN WHICH THE LIGHT IS UNIFORMLY TRANSMITTED THROUGHOUT THE SCREEN

BACKGROUND OF THE INVENTION

This application claims the priority of Korean Patent Application No. 2003-48428, filed on Jul. 15, 2003, in the Korean Intellectual Property Office, the disclosure of which is incorporated herein in its entirety by reference.

1. Field of the Invention

The present invention relates to a screen for a projection display and, more particularly, to a projection display with a high definition view, slim structure and a large screen in which the light is uniformly transmitted throughout the screen even when an incident angle of light emitted from an optical projection system onto the screen is different depending on the position on the screen to which the light is transmitted.

2. Description of the Related Art

Referring to FIG. 1, a projection screen usually includes a Fresnel lens sheet 10 which collects light flux projected by an optical projection system toward a viewer, and a lenticular lens sheet 20 which disperses the light output from the Fresnel lens sheet 10 at a predetermined angle with respect to a horizontal direction of the screen, to widen a viewing angle.

A lenticular lens 20a is formed on an incident surface of the lenticular lens sheet 20 to disperse light in the horizontal direction. A black stripe 20b is formed on an exit surface of the lenticular lens sheet 20 to absorb the diverging light and to block the externally incident light, thereby increasing a contrast ratio.

Recently, projection displays having a large screen, a high definition view, and a slim structure have been researched and developed. In FIG. 2A, an optical projection system 25 is disposed at the same level as a center of the Fresnel lens sheet 10, with a plane incident surface 10a and an exit surface 10b. With this arrangement, it is necessary to decrease the height of a quadrangular pyramid of a light flux output from the optical projection system 25 to make the projection displays slim. However, when the optical projection system 25 is disposed at the same level as the center of the screen, the light flux output from the optical projection system 25 cannot be decreased to an optimal height of the quadrangular pyramid.

To solve this problem, the optical projection system 25 is disposed obliquely below the screen, as shown in FIG. 2B. However, in this case, the light loss increases due to a reflection at a peripheral portion of the Fresnel lens sheet 10, and the brightness at the peripheral portion of the screen decreases, thereby deteriorating a picture quality.

FIG. 3 is a graph illustrating the relationship between the transmittance of the Fresnel lens sheet 10 and an incident angle of light for the Fresnel lens sheet 10. Referring to FIG. 3, as the incident angle increases, the transmittance of the Fresnel lens sheet 10 rapidly decreases. In the graph illustrated in FIG. 3, T1 denotes an amount of light passing through a plane incident surface 10a of the Fresnel lens sheet 10 shown in FIG. 2, T2 denotes an amount of light passing through an exit surface 10b, i.e., a Fresnel lens surface, and TT denotes a product of T1 and T2.

As the light approaches the top of the screen, the incident angle of light increases more significantly in a system shown in FIG. 2B (referred to as a second system) than in a system shown in FIG. 2A (referred to as a first system). Accordingly, referring to FIG. 3, the light loss due to the reflection of light in the peripheral portion of the screen is greater in the second system than in the first system.

Consequently, when the light from an optical projection system 25 is obliquely incident onto a screen, as shown in FIG. 2B, a projection display can be made slim, but the picture quality deteriorates since a dark area and a bright area occur on the screen.

SUMMARY OF THE INVENTION

The present invention has been made in view of the above-mentioned problems. Accordingly, it is an aspect of the present invention to provide a screen which has uniform luminance by evenly distributing the light transmittance in the horizontal and vertical directions of the screen, which further increases the light transmittance, and which makes a projection system slim.

To accomplish the aforementioned aspect, a screen for a projection display is provided. The screen includes a Fresnel lens sheet which converges light emitted from a light source and a lenticular lens sheet which disperses in a horizontal direction the light transmitted by the Fresnel lens sheet. The Fresnel lens sheet includes a first Fresnel lens on one surface and a second Fresnel lens on an opposite surface.

The first Fresnel lens may further include a number of Fresnel lens units. Each of these Fresnel lens units may include a first Fresnel lens surface and a second Fresnel lens surface, where a first angle (of the first Fresnel lens surface with respect to a central line between the first and second Fresnel lens surfaces) and a second angle (of the second Fresnel lens surface with respect to the central line) are changed according to the incident angles of the light.

To further solve the above-described problems, the first angle has a range of $$\frac{\pi}{2} - \alpha_1 \leq \theta_1 \leq \frac{\pi}{2}$$

where $\theta_1$ is the first angle and $\alpha_1$ is a first incident angle of the light with respect to a normal line of the screen.

Another aspect of the present invention provides a screen where each Fresnel lens unit is a total internal reflection prism.

Moreover, a condition of $$0 \leq \theta_2 - \frac{\pi}{2} + (\theta_1 + \theta_2) - \sin^{-1}\left(\sin\left(\frac{\alpha_1 - \frac{\pi}{2} + \theta_1}{n_2}\right)\right) \leq \frac{2\pi}{9}$$

is satisfied, where $\alpha_1$ is a first incident angle of the light with respect to a normal line of the screen, $n_2$ is a refractive index of a medium through which the light passes after being incident onto the first Fresnel lens surface, $\theta_1$ is the first angle, and $\theta_2$ is the second angle.

Preferably, the first Fresnel lens and the screen are eccentric such that the center of the first Fresnel lens is below the center of the screen.

The first Fresnel lens may also include two or more of the following elements: a plate, a refraction prism, and a total internal reflection prism based on the incident angles of light.

Preferably, the first Fresnel lens includes the plate in an area where the incident angle of light $\alpha_1$ with respect to a normal line of the screen, has a range of $0 \leq \alpha_1 < 20$, the refraction prism in an area where $20 \leq \alpha_1 < 50$, and the total internal reflection prism in an area where $50 \leq \alpha_1 \leq 80$.

BRIEF DESCRIPTION OF THE DRAWINGS

The above and other features and advantages of the present invention will become more apparent by describing in detail illustrative, non-limiting embodiments thereof with reference to the attached drawings in which.

Figure 1:
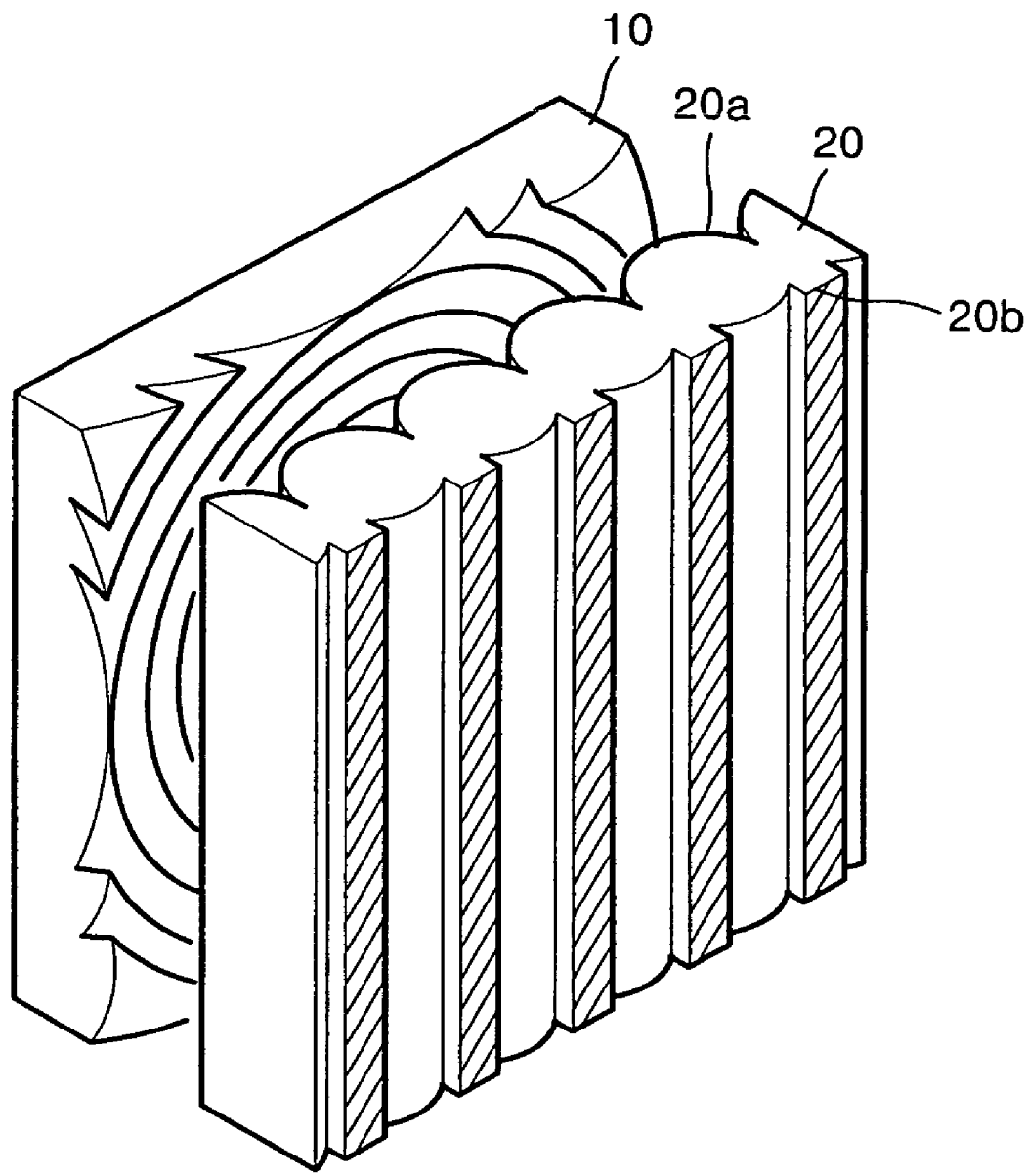
FIG. 1 is a perspective view of a conventional screen for a projection display.
Figure 2A:
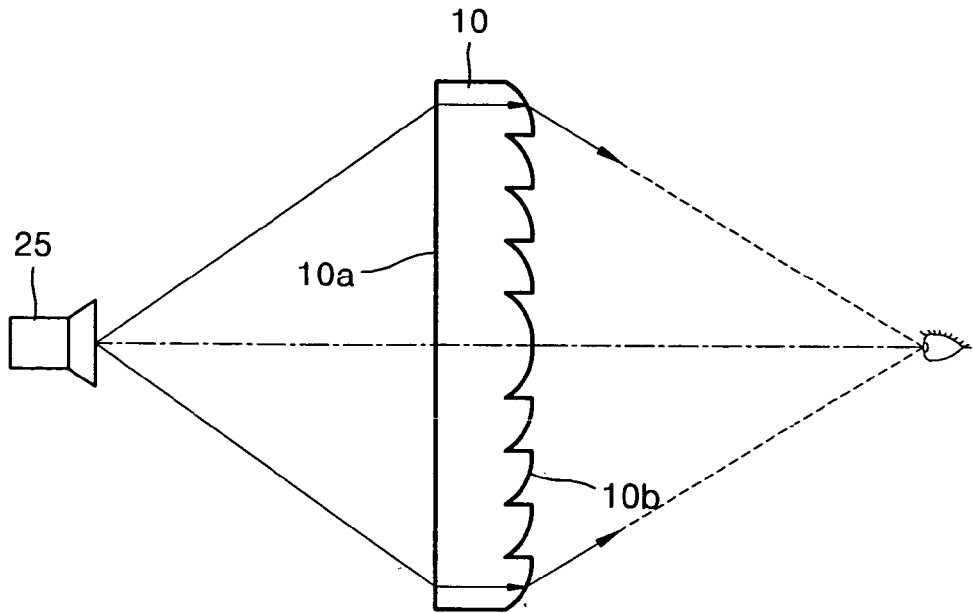
FIG. 2A illustrates a conventional structure in which an optical projection system is disposed at the same level as the center of a screen.
Figure 2B:
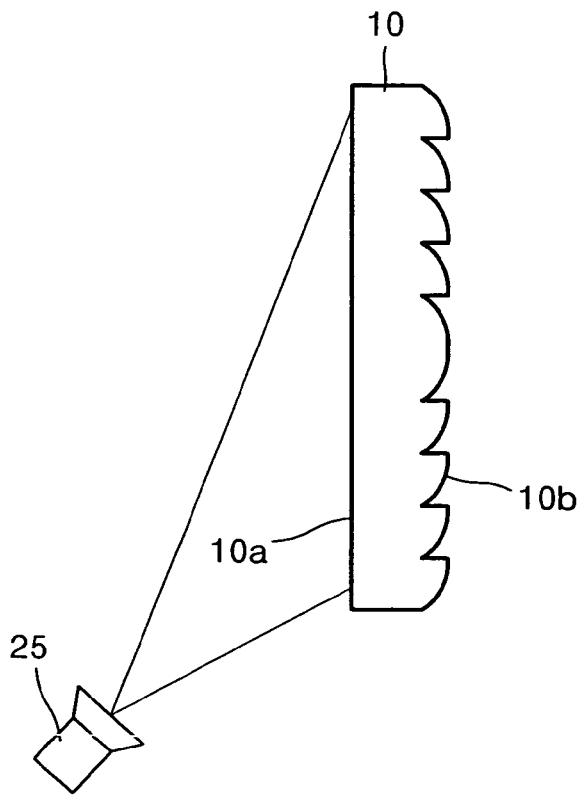
FIG. 2B illustrates another conventional structure in which an optical projection system is disposed below the screen.

DETAILED DESCRIPTION OF THE ILLUSTRATIVE, NON-LIMITING EMBODIMENTS OF THE PRESENT INVENTION

The present invention will now be described in detail by describing illustrative, non-limiting embodiments thereof with reference to the accompanying drawings. In the drawings, the same reference characters denote the same elements.

Figure 4A:
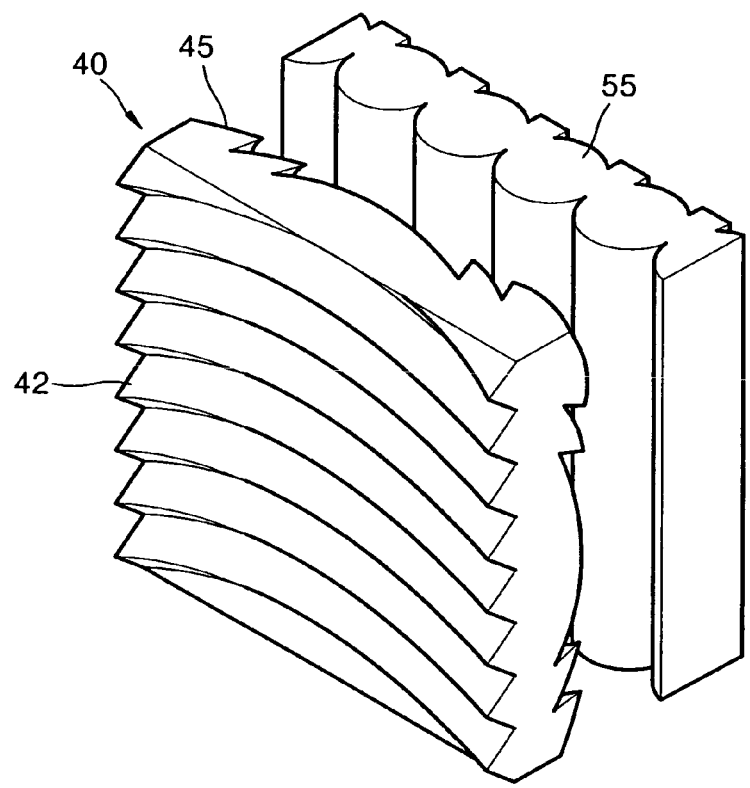
FIG. 4A is a perspective view of a screen for a projection display, according to a first illustrative, non-limiting embodiment of the present invention.
Figure 4B:
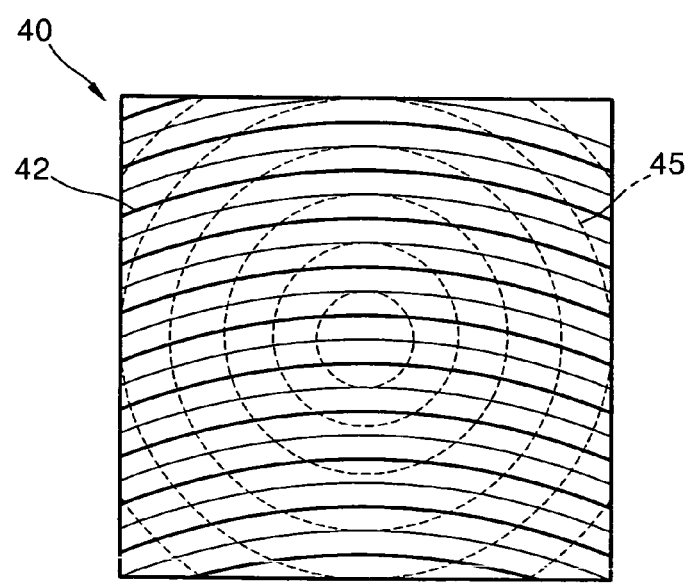
FIG. 4B is a side view of a Fresnel lens sheet employed in the screen according to the first embodiment of the present invention.

Referring to FIGS. 4A and 4B, a screen for a projection display according to the first illustrative, non-limiting embodiment of the present invention includes a Fresnel lens sheet 40 and a lenticular lens sheet 55. The Fresnel lens sheet 40 includes a first Fresnel lens 42 on one surface and a second Fresnel lens 45 on an opposite surface. The lenticular lens sheet 55 disperses in a horizontal direction light transmitted by the Fresnel lens sheet 40. The first and second Fresnel lenses 42 and 45 may have their centers at the same level or at a different level as the center of the screen.

Figure 5:
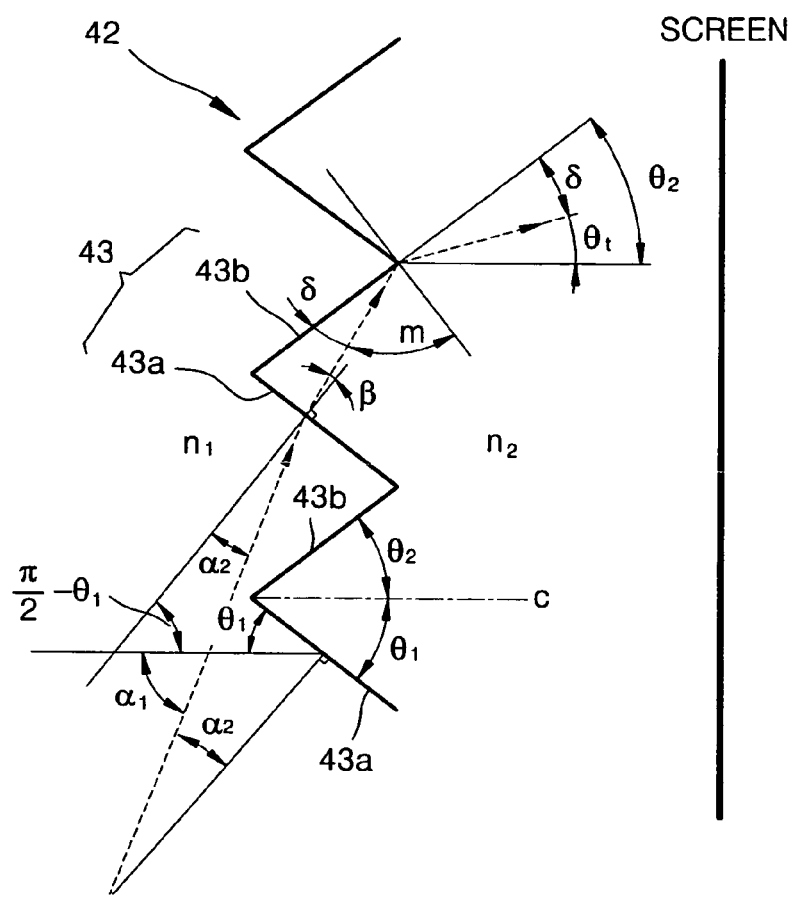
FIG. 5 is a partial enlarged view of a Fresnel lens employed in the screen according to the first embodiment of the present invention.

Referring to FIG. 5, the first Fresnel lens 42 includes a number of ridges. Each ridge is a a Fresnel lens unit. In other words, the first Fresnel lens 42 has a number of units 43.

Each Fresnel lens unit 43 has a first Fresnel lens surface 43a and a second Fresnel lens surface 43b. FIG. 5 is an enlarged view of the first and second Fresnel lens surfaces 43a and 43b included in the Fresnel lens unit 43. In FIG. 5, $\theta_1$ denotes a first angle of the first Fresnel lens surface 43a with respect to a central line "c" between the first and second Fresnel lens surfaces 43a and 43b, $\theta_2$ denotes a second angle of the second Fresnel lens surface 43b with respect to the central line "c", $\alpha_1$ denotes a first incident angle with respect to a normal line of the screen, and $\alpha_2$ denotes a second incident angle with respect to a normal line of the second Fresnel lens surface 43b. In this case, the second incident angle $\alpha_2$ can be expressed by Formula (1).

$$\alpha_2 = \alpha_1 - \frac{\pi}{2} + \theta_1 \tag{1}$$

In addition, $n_1$ denotes a refractive index of a first medium through which the light passes before being incident onto the first Fresnel lens 42, $n_2$ denotes a refractive index of a second medium through which the light passes after being incident onto the first Fresnel lens 42, and $\beta$ denotes a refraction angle of the light after being incident onto the first Fresnel lens surface 43a. Using these four values, Formula (2) is derived according to Snell's law.

$$n_1 \sin \alpha_2 = n_2 \sin \beta \tag{2}$$

In particular, when the refractive index of the first medium is 1, $\beta$ is obtained by Formula (3).

$$\beta = \sin^{-1}\left(\frac{\sin \alpha_2}{n_2}\right) \tag{3}$$

When the light refracted by the first Fresnel lens surface 43a is further reflected by the second Fresnel lens surface 43b, the angle formed between the second Fresnel lens surface 43b and the reflected light is denoted by $\delta$. In this case, $\delta$ can be derived using Formula (4).

$$\delta = \frac{\pi}{2} + \beta - (\theta_1 + \theta_2) \tag{4}$$

In addition, "m" denotes an incident angle or a reflection angle of the light with respect to the second Fresnel lens surface 43b and is obtained by Formula (5).

$$m = \frac{\pi}{2} - \delta \tag{5}$$

When an angle between the normal line of the screen and the reflected light, i.e., an exit angle of the light with respect to the normal line of the screen, is denoted by $\theta_t$, the exit angle $\theta_t$ can be defined using $\theta_1$, $\theta_3$, and $\alpha_2$ based on Formulae (4) and (5) as follows.

$$\theta_t = \theta_2 - \delta \tag{6}$$

$$= \theta_2 - \frac{\pi}{2} + m$$

$$= \theta_2 - \frac{\pi}{2} + (\theta_1 + \theta_2) - \sin^{-1}\left(\frac{\sin\alpha_2}{n_2}\right)$$

In addition, the exit angle $\theta_t$ can be defined using $\theta_1$, $\theta_2$, and $\alpha_1$ based on the Formula (1) as follows.

$$\theta_t = \theta_2 - \frac{\pi}{2} + (\theta_1 + \theta_2) - \sin^{-1}\left(\sin\left(\frac{\alpha_1 - \frac{\pi}{2} + \theta_1}{n_2}\right)\right) \quad (7)$$

The first Fresnel lens 42 increases light transmittance throughout the screen and also increases the uniformity of luminance throughout the screen. In particular, as the incident angle of light $\alpha_1$ with respect to the normal line of the screen increases, the uniformity of luminance also effectively increases.

To increase the light transmittance and the uniformity of luminance, the first angle $\theta_1$ and the second angle $\theta_2$ are changed according to a vertical position on the screen. It is preferable that the first angle $\theta_1$ and the second angle $\theta_2$ satisfy the following conditions.

Figure 3:
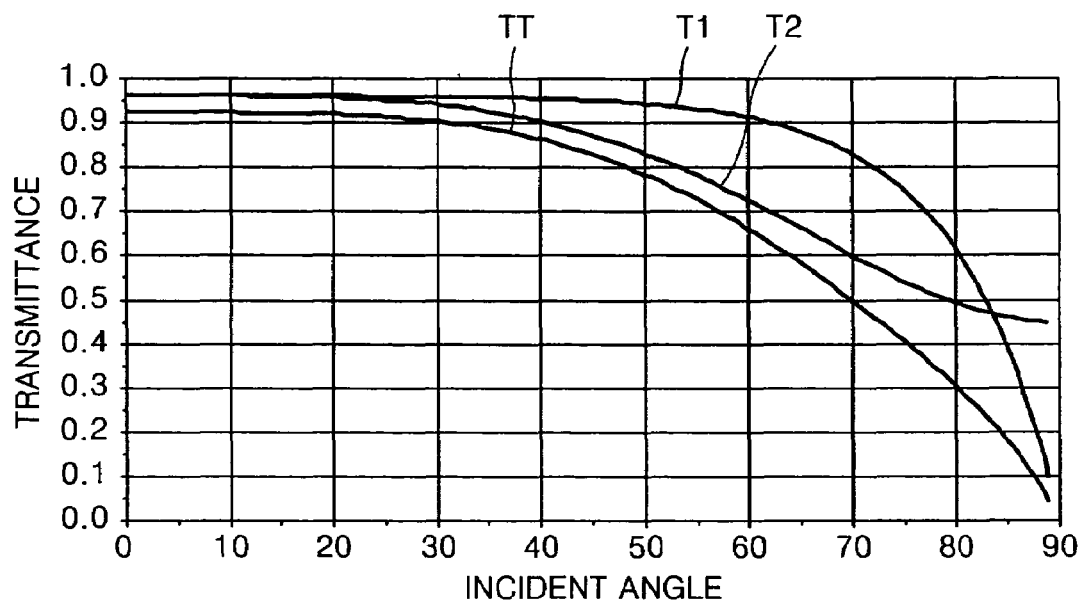
FIG. 3 is a graph showing the relationship between the transmittance of light and the incident angle of light in a conventional Fresnel lens sheet.

Firstly, referring to FIG. 3, the transmittance of light is over 90% when the incident angle is in a range from 0E to 30E. Accordingly, it is preferable for the second incident angle $\alpha_2$ with respect to the first Fresnel lens surface 43a to have a range of $0 \leq \alpha_2 \leq 30$. Based on this fact, it is preferable for the second incident angle $\alpha_2$ to have a range of $0 \leq \alpha_2 \leq \pi/6$ in order to decrease the amount of light reflected when the light is incident onto the first Fresnel lens 42. The value of the first angle $\theta_1$ so as to allow the second incident angle $\alpha_2$ to have the preferable range, can be derived using Formula (1) as follows.

$$0 \leq \alpha_1 - \frac{\pi}{2} + \theta_1 \leq \frac{\pi}{6} \quad (8)$$

$$\frac{\pi}{2} - \alpha_1 \leq \theta_1 \leq \frac{2}{3}\pi - \alpha_1$$

When the first angle $\theta_1$ has a range defined by Formula (8) with respect to the first incident angle $\alpha_1$, the first Fresnel lens 42 can obtain a transmittance of over 90%. In the meantime, since the first angle $\theta_1$ should be smaller than 90 degrees taking into account the usual structure of a Fresnel lens, it is preferable that the first angle $\theta_1$ has a range of $$\frac{\pi}{2} - \alpha_1 \leq \theta_1 \leq \frac{\pi}{2}.$$

Figure 6:
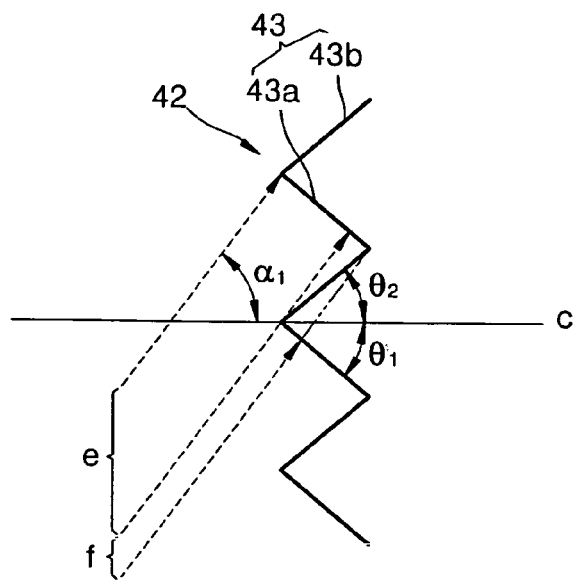
FIG. 6 illustrates a relationship between the incident light and a prism unit of the Fresnel lens when the light is incident onto the Fresnel lens employed in the screen according to the first embodiment of the present invention.

Secondly, it is preferable to determine the second angle $\theta_2$ so as to minimize an area "f" of the first Fresnel lens surface 43a onto which the light is not incident due to the second Fresnel lens surface 43b. When the second angle $\theta_2$ is greater than the first incident angle $\alpha_1$, the light transmitted by the first Fresnel lens surface 43a may not be incident onto the second Fresnel lens surface 43b. Accordingly, it is preferable that the second angle $\theta_2$ is equal to or smaller than the first incident angle $\alpha_1$ such that the light transmitted by the first Fresnel lens surface 43a can be incident onto the second Fresnel lens surface 43b and then the light reflected by the second Fresnel lens surface 43b satisfies a third condition, i.e., total internal reflection, which will be described later. Considering the above-described requirements, the second angle $\theta_2$ can be defined by Formula (9). In FIG. 6, a reference character "e" denotes an area of the first Fresnel lens surface 43a onto which the light is incident.

$$\theta_2 \leq \alpha_1 \quad (9)$$

Thirdly, it is preferable to subject the light to total internal reflection by the second Fresnel lens surface 43b. The condition expressed by Formula (10) must be satisfied to subject the light to total internal reflection by the second Fresnel lens surface 43b.

$$m \geq \sin^{-1}\left(\frac{n_1}{n_2}\right) \quad (10)$$

Formula (10) provides a total internal reflection at the second Fresnel lens surface 43b. As a result, when $n_1=1$, Formula (10) can be rearranged with respect to $\theta_1$ and $\theta_2$ using Formulae (4) and (5) as follows.

$$\sin^{-1}\left[\sin\left(\frac{\alpha_1 - \frac{\pi}{2} + \theta_1}{n_2}\right)\right] \geq \theta_1 + \theta_2 - \sin^{-1}\left(\frac{1}{n_2}\right) \quad (11)$$

When the first and second angles $\theta_1$ and $\theta_2$ satisfy the above-described total internal reflection condition, the Fresnel lens unit 43 can be a total internal reflection prism. In addition, the first and second angles $\theta_1$ and $\theta_2$ of the Fresnel lens unit 43 change according to the first incident angle $\alpha_1$.

Meanwhile, the exit angle $\theta_t$ of the first Fresnel lens 42 corresponds to an incident angle of the light onto the second Fresnel lens 45. Referring to FIG. 3, the second Fresnel lens 45 has a transmittance of over 90% when the incident angle of light onto the second Fresnel lens 45 is less than 30 degrees. However, taking into account the light loss at the first Fresnel lens 42, it is preferable for the exit angle $\theta_t$ of the first Fresnel lens 42 to have a range of $0 \leq \theta_t \leq 20$. As a result, the fourth condition is to have the exit angle $\theta_t$ satisfy the conditional expression $0 \leq \theta_t \leq 20$ using Formula (7).

It is preferable for the screen to have the first and second Fresnel lens surfaces 43a and 43b with the first and second angles $\theta_1$ and $\theta_2$ satisfy at least two of the above-described conditions. For example, the Fresnel lens unit 43 may be formed having the first and second angles $\theta_1$ and $\theta_2$ with respect to the first incident angle $\alpha_1$ satisfy Formulae (8) and (9), or satisfying Formula (8) and having the exit angle $\theta_t$ in a predetermined range based on the Formula (7), or satisfying Formulae (9) and (10) or (11). When Formulae (8) and (9) are satisfied, the Fresnel lens unit 43 functions as a refraction prism just refracting light. When Formulae (9) and (10) or (11) are satisfied, the Fresnel lens unit 43 functions as a total internal reflection prism.

More preferably, the amount of light reflected by the first Fresnel lens surface 43a can be minimized by making $\alpha_2=0$. When $\alpha_2=0$, Formula (1) can be rewritten as Formula (12).

$$\theta_1 = 90 - \alpha_1 \quad (12)$$

Usually, the first incident angle $\alpha_1$ has a range of about $0 \leq \alpha_1 \leq 80$. For example, it is preferable that $\theta_1=30$ when $\alpha_1=60$ and $\theta_1=50$ when $\alpha_1=40$.

In addition, according to the Formula (10), when $n_2=1.585$, $m \geq 39.11$. For example, when $m=40$ and $\theta_2=60$, the exit angle $\theta_t$ becomes 10 degrees according to the Formula (6).

As described above, when the first and second angles $\theta_1$ and $\theta_2$ change according to the first and second incident angles $\alpha_1$ and $\alpha_2$ onto the first Fresnel lens surface 43a, uniform light transmittance throughout the screen can be achieved even when the incident angle of light onto the screen changes according to a vertical position on the screen. In addition, the amount of light can be increased throughout the screen. In other words, the light transmittance can be increased in a portion of a conventional screen which typically has had a low transmittance, and an overall amount of light and uniformity of luminance throughout the screen can also be increased, by decreasing the incident angle $\theta_t$ of light onto the second Fresnel lens 45 and equalizing incident angles of the light onto the second Fresnel lens 45 throughout the screen.

Figure 7:
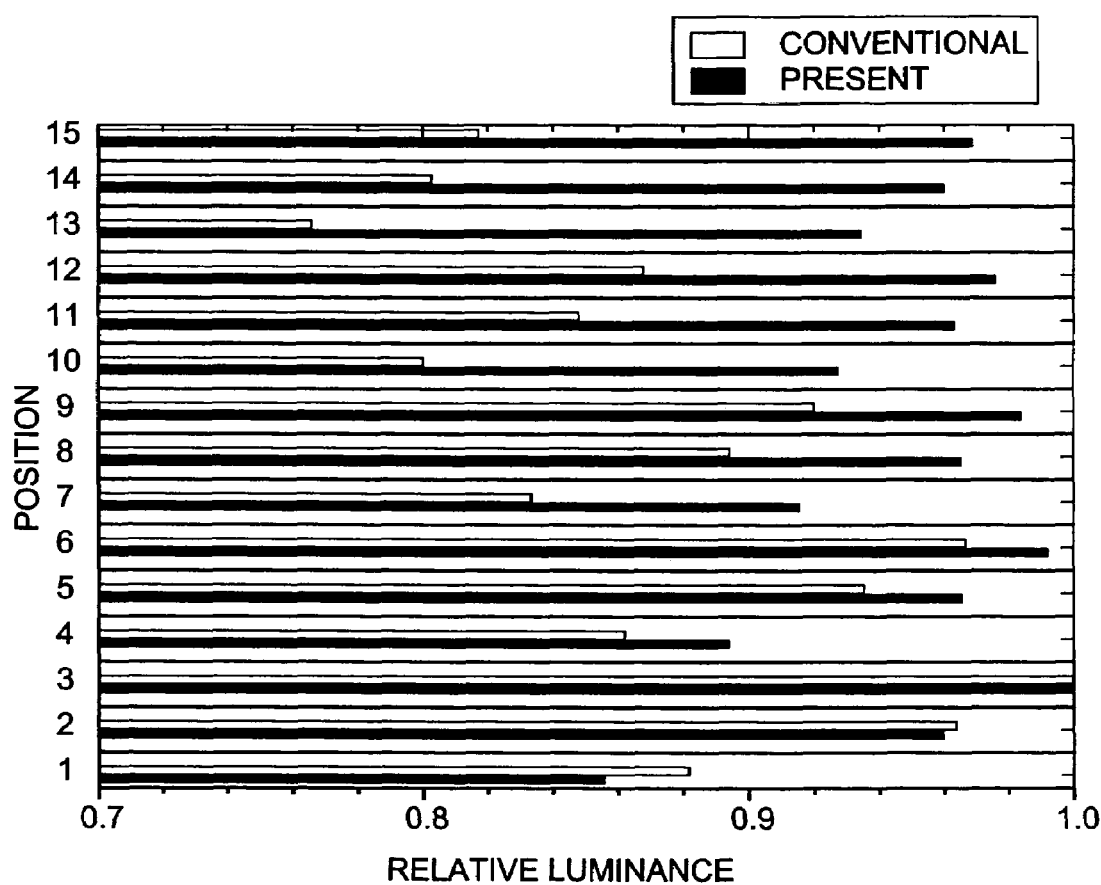
FIG. 7 is a graph comparing the light transmittance, according to incident position, between the screen according to the first embodiment of the present invention and the conventional screen.
Figure 8:
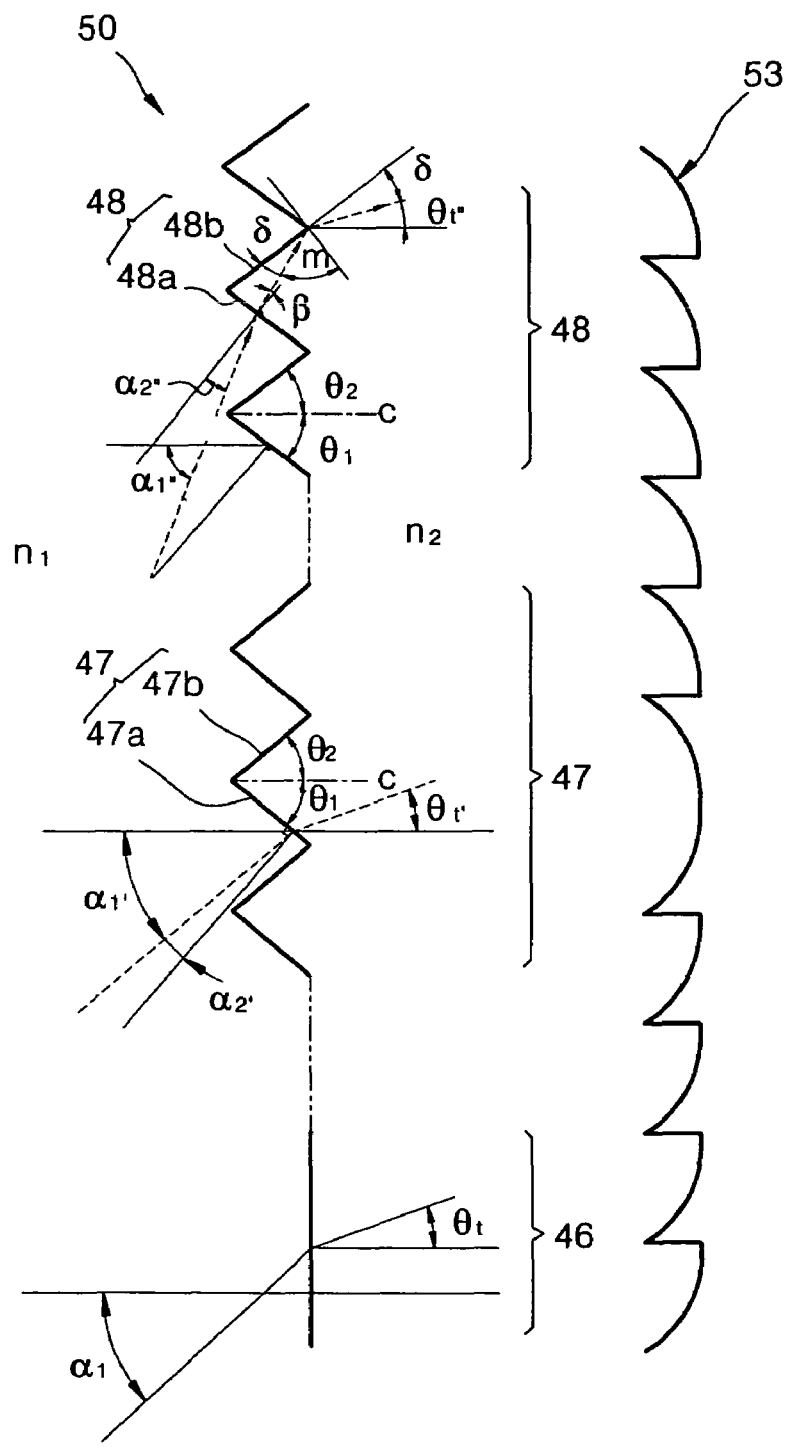
FIG. 8 illustrates a structure of a Fresnel lens employed in the screen according to a second illustrative, non-limiting embodiment of the present invention.

FIG. 7 is a graph of the relative luminance at various positions i.e., a vertical position, on a quadrant I of the screen. In the graph shown in FIG. 7, a white bar indicates the light transmitted by a conventional Fresnel lens sheet, and a black bar indicates the light transmitted by a Fresnel lens sheet according to the first, illustrative, non-limiting embodiment of the present invention. Referring to the graph, an amount of light increases throughout the screen, and uniformity of luminance is remarkably increased in the peripheral portion of the screen.

The first Fresnel lens 42 may be formed on either the incident surface or the exit surface of the Fresnel lens sheet 40. The second Fresnel lens 45 may be a refraction Fresnel lens or a total reflection Fresnel lens. When the first Fresnel lens 42 is formed on the incident surface of the Fresnel lens sheet 40, the second Fresnel lens 45 converges light, which has uniform exit angles due to the first Fresnel lens 42. When the first Fresnel lens 42 is formed on the exit surface of the Fresnel lens sheet 40, light converged by the second Fresnel lens 45 is output at uniform angles due to the first Fresnel lens 42 so that luminance is uniformly distributed throughout the screen.

In the first embodiment of the present invention, the screen is designed such that the first and second angles $\theta_1$ and $\theta_2$ are changed according to the first and second incident angles $\alpha_1$ and $\alpha_2$. In this arrangement, since the first and second incident angles $\alpha_1$ and $\alpha_2$ change according to the horizontal and vertical positions on the screen, the first and second angles $\theta_1$ and $\theta_2$ also change according to the horizontal and vertical positions on the screen. As a result, luminance is uniformly distributed in both of the horizontal and vertical directions of the screen.

The following description relates to a screen for a projection display according to a second illustrative, non-limiting embodiment of the present invention.

The screen according to the second embodiment of the present invention includes a first Fresnel lens 50 and a second Fresnel lens 53. The first Fresnel lens 50 may have two or more of the following elements: a plate 46, a refraction prism 47, and a total internal reflection prism 48 depending on the incident angle of light. The second Fresnel lens 53 has a refraction Fresnel lens. The reflection prism has surfaces 48a and 48b.

The first Fresnel lens 50 includes a number of Fresnel lens unit, each of which is implemented by the plate 46, the refraction prism 47, or the total internal reflection prism 48. For example, the first Fresnel lens 50 may have the plate 46 in an area where an incident angle $\alpha_1$ has a range of $0 \leq \alpha_1 < 20$, the refraction prism 47 in an area where an incident angle $\alpha_1'$ has a range of $20 \leq \alpha_1' < 50$, and the reflection prism 48 in an area where an incident angle $\alpha_1''$ has a range of $50 \leq \alpha_1'' \leq 80$.

Referring to FIG. 3, since the light transmission loss is small in the area where the incident angle $\alpha_1$ has the range of $0 \leq \alpha_1 < 20$, for the manufacturing efficiency, it is preferable to have the plate 46 as a Fresnel lens unit in this area. When the light is incident onto the plate 46 at the incident angle $\alpha_1$ having the range of $0 \leq \alpha_1 < 20$, if a refractive index $n_1$ of a first medium before the plate 46 is less than a refractive index $n_2$ of a second medium through which the light passes after being incident onto the plate 46, a refraction angle (or an exit angle) $\theta_t$ of the light onto the plate 46 is less than the incident angle $\alpha_1$. Accordingly, the light passing through the plate 46 is incident onto the second Fresnel lens 53 at an angle of less than 20 degrees.

It is preferable that the refraction prism 47, which satisfies Formulae (8) and (9), is used as a Fresnel lens unit when the incident angle $\alpha_1'$ has a range of $20 \leq \alpha_1' < 50$. The refraction prism 47 has a first Fresnel lens surface 47a and a second Fresnel lens surface 47b. A first angle of the first Fresnel lens surface 47a with respect to a normal line of the screen is denoted by $\theta_1$, and a second angle of the second Fresnel lens surface 47b with respect to the normal line of the screen is denoted by $\theta_2$. In this arrangement, the light incident onto the first Fresnel lens surface 47a is set to output the light at the exit angle $\theta_t$ which is equal to or less than 20 degrees due to the refraction by the first Fresnel lens surface 47a.

When the incident angle $\alpha_1'$ increases to be equal to or greater than 50 degrees, the first angle $\theta_1$ also increases. As a result, since a portion of the first Fresnel lens surface 47a shaded by the second Fresnel lens surface 47b increases, an area of the first Fresnel lens surface 47a substantially decreases and an area of the second Fresnel lens surface 47b substantially increases. Accordingly, when a Fresnel lens unit is formed to have a uniform thickness, the size of the first Fresnel lens surface 47a performing refraction decreases and a reduction of the exit angle $\theta_t$ due to the refraction also decreases. Consequently, it is preferable to use the refraction prism 47 when the incident angle $\alpha_1'$ is less than 50 degrees and to use a prism of a type other than a refraction type when the incident angle $\alpha_1'$ is greater than 50 degrees.

When the light is incident onto the refraction prism 47 at the incident angle $\alpha_1'$ having a range of $20 \leq \alpha_1' < 50$, it is preferable that the second angle $\theta_2$ is less than the incident angle $\alpha_1$ according to Formula (9). In this arrangement, it is preferable that an exit angle $\theta_t'$ is equal to or less than 20 degrees. In this case, only refraction by the first Fresnel lens surface 47a without total internal reflection by the second Fresnel lens surface 47b is considered. The exit angle $\theta_t'$ can be defined using Snell's law as follows, assuming g that $n_1=1$.

$$\theta_t' = \frac{\pi}{2} - \theta_1 - \sin^{-1}\left(\sin\frac{\alpha_1 - \frac{\pi}{2} + \theta_1}{n_2}\right) \tag{13}$$

A conditional expression for making the exit angle $\theta_t'$ equal to or less than 20 degrees can be obtained using Formula (13) as follows.

$$0 \le \frac{\pi}{2} - \theta_1 - \sin^{-1}\left(\sin\frac{\alpha_1 - \frac{\pi}{2} + \theta_1}{n_2}\right) \le 20 \quad (14)$$

When $$-1 \le \sin\left\{\left(\alpha_1 - \frac{\pi}{2} + \theta_1\right)\right\} \le 1$$

and $n_2$ is about 1.5, the arcsin has a value ranging from −40 degrees to +40 degrees. When the arcsin is in the range of −40 to +40 degrees, the first angle $\theta_1$ is obtained as follows.

$$30 \le \theta_1 \le 50$$

$$110 \le \theta_1 \le 130 \quad (15)$$

Meanwhile, since the first angle $\theta_1$ needs to be less than 90 degrees, it is preferable that the first angle $\theta_1$ has the range of $30 \le \theta_1 \le 50$ in Formula (15).

When the incident angle $\alpha_1''$ has the range of $50 \le \alpha_1'' \le 80$, the first and second angles $\theta_1$ and $\theta_2$ can be set to make the exit angle $\theta_t'$ equal to or less than 20 degrees. When the incident angle $\alpha_1''$ has the range of $50 \le \alpha_1'' \le 80$, it is preferable to use the total internal reflection prism 48 as a Fresnel lens unit.

The first angle $\theta_1$ is set to make a second incident angle $\alpha_2$ zero in order to minimize the reflection of light by the first Fresnel lens 50. When $$\alpha_2 = 0, \theta_1 = \frac{\pi}{2} - \alpha_1$$

according to the Formula (1). According to the Formula (3), $\beta=0$. In addition, $$m = \theta_1 + \theta_2 = \frac{\pi}{2} - \alpha_1 + \theta_2$$

in Formula (5).

Next, when the total internal reflection condition, i.e., Formula (10), is satisfied, Formula (16) is derived.

$$\theta_2 \ge \sin^{-1}\left(\frac{1}{n_2}\right) - \frac{\pi}{2} + \alpha_1 \quad (16)$$

In this arrangement, it is assumed that $n_1=1$. For example, when acryl medium having $n_2=1.585$ is used, $\theta_2 > \alpha_1 - 50.89$. In addition, since the condition of $\theta_2 > 0$ needs to be satisfied, $\alpha_1''$ needs to be set to greater than 50.89 degrees. When $n_2=1.585$, the condition of $\alpha_1'' > 50.89$ is satisfied. In other words, the range of $\alpha_1''$ can be changed based on the value of $n_2$.

Next, when an exit angle $\theta_t''$ is set to have a range of $0 \le \theta_t'' \le 20$ using Formula (7), Formula (17) is derived.

$$\frac{\alpha_1''}{2} \le \theta_2 \le 10 + \frac{\alpha_1''}{2} \quad (17)$$

As described above, when the incident angle $\alpha_1''$ has the range of $50 \le \alpha_1'' \le 80$, the total internal reflection prism 48 is used as a Fresnel lens unit and the first and second angles $\theta_1$ and $\theta_2$ change according to the incident angle $\alpha_1''$. In this arrangement, since the incident angle $\alpha_1''$ changes in the horizontal and vertical directions of the screen, the first and second angles $\theta_1$ and $\theta_2$ also change according to a vertical position and a horizontal position on the screen.

In addition, the first Fresnel lens 50 may have the refraction prism 47 and the total internal reflection prism 48 according to the incident angles. Alternatively, the first Fresnel lens 50 may have the plate 46 and the refraction prism 47 depending on the incident angles.

As described above, a screen for a projection display according to the illustrative, non-limiting embodiments of the present invention has Fresnel lenses on the opposite surfaces of a Fresnel lens sheet. The Fresnel lens has a number of total internal reflection prisms whose internal angles are different according to the incident angles of light. Alternatively, the Fresnel lens may have two or more of the following elements: a plate, a refraction prism, and a total internal reflection prism, based on the incident angles of light. The Fresnel leans has the above-described elements to obtain a uniform high luminance throughout the entire screen. In addition, the light obliquely incident onto a screen in a slim projection display is compensated in both the horizontal and vertical directions of the screen using a Fresnel lens sheet according to the illustrative, non-limiting embodiments of the present invention so that the luminance is uniformly or equally distributed throughout the screen. As a result, the picture quality of the screen can be improved.

The above and other features of the invention including various and novel details of the process and construction of the parts has been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention.

What is claimed is:

1. A screen for a projection display, the screen comprising:
a Fresnel lens sheet operable to converge light emitted from a light source; and
a lenticular lens sheet operable to disperse in a horizontal direction the light transmitted by the Fresnel lens sheet,
wherein the Fresnel lens sheet comprises a first Fresnel lens on one surface and a second Fresnel lens on an opposite surfaces,
wherein the first Fresnel lens comprises a plurality of Fresnel lens units, each of the plurality of Fresnel lens units comprises a first Fresnel lens surface and a second Fresnel lens surface,
wherein a first angle of the first Fresnel lens surface with respect to a central line between the first and second Fresnel lens surfaces, and a second angle of the second Fresnel lens surface with respect to the central line, are changed depending on incident angles of the light, and wherein the first angle has a range of $$\frac{\pi}{2} - \alpha_1 \le \theta_1 \le \frac{\pi}{2}$$

where $\theta_1$ is the first angle and $\alpha_1$ is a first incident angle of the light with respect to a normal line of the screen.

2. The screen of claim 1, wherein the second angle satisfies a condition of $\theta_2 = \alpha_1$ where $\theta_2$ is the second angle and $\alpha_1$ is a first incident angle of the light with respect to a normal line of the screen, and wherein when the condition is satisfied, there is minimized an amount of the light which is incident onto the first Fresnel lens surface but is blocked by the second Fresnel lens surface, is minimized.

3. The screen of claim 1, wherein each of said Fresnel lens units is a total internal reflection prism.

4. The screen of claim 1, wherein a condition of $$m \ge \sin^{-1}\left(\frac{n_1}{n_2}\right)$$

is satisfied where "m" is an incident angle of the light onto the first Fresnel lens surface, $n_1$ is a first refractive index of a medium through which the light passes before being incident onto the second Fresnel lens surface, and $n_2$ is a second refractive index of a medium through which the light passes after being incident onto the first Fresnel lens surface.

5. The screen of claim 1, wherein a condition of $$0 \le \theta_2 - \frac{\pi}{2} + (\theta_1 + \theta_2) - \sin^{-1}\left(\sin\left(\frac{\alpha_1 - \frac{\pi}{2} + \theta_1}{n_2}\right)\right) \le \frac{2\pi}{9}$$

is satisfied where $\alpha_1$ is a first incident angle of the light with respect to a normal line of the screen, $n_2$ is a refractive index of a medium through which the light passes after being incident onto the first Fresnel lens surface, $\theta_1$ is the first angle, and $\theta_2$ is the second angle.

6. The screen of claim 1, wherein the first Fresnel lens has a center at a different position from the second Fresnel lens.

7. The screen of claim 6, wherein the first Fresnel lens and the screen are eccentric such that the center of the first Fresnel lens is below a center of the screen.

8. The screen of claim 1, wherein the first Fresnel lens comprises at least two of a plate, a refraction prism, and a total internal reflection prism based on incident angles of the light.

9. The screen of claim 8, wherein the first Fresnel lens comprises:

the plate in an area where the incident angle $\alpha_1$ of the light with respect to a normal line of the screen has a first range of $0 \le \alpha_1 < 20$, the refraction prism in an area where the incident angle $\alpha_1$ of the light with respect to the normal line of the screen has a second range of $20 \le \alpha_1 < 50$, and the reflection prism in an area where the incident angle $\alpha_1$ of the light with respect to the normal line of the screen has a third range of $50 \le \alpha_1 \le 80$.

10. The screen of claim 9, wherein the refraction prism satisfies a condition of $$0 \le \frac{\pi}{2} - \theta_1 - \sin^{-1}\left(\sin\left(\frac{\alpha_1 - \frac{\pi}{2} + \theta_1}{n_2}\right)\right) \le 20$$

where $\theta_1$ is a first angle of one surface of the refraction prism with respect to a central line of the refraction prism and $\theta_2$ is a second angle of the other surface of the refraction prism with respect to the central line.

11. The screen of claim 8, wherein the total internal reflection prism satisfies a condition of $$\theta_1 = \frac{\pi}{2} - \alpha_1$$

where $\theta_1$ is a first angle of one surface of the total internal reflection prism with respect to a central line of the total internal reflection prism and $\alpha_1$ is an incident angle of the light with respect to a normal line of the screen.

12. The screen of claim 11, wherein a condition of $$\theta_2 \ge \sin^{-1}\left(\frac{1}{n_2}\right) - \frac{\pi}{2} + \alpha_1$$

is satisfied, where $\theta_2$ is a second angle of a second surface of the total reflection prism with respect to the central line, and $n_2$ is a refractive index of a medium through which the light passes after being incident onto the first Fresnel lens.

13. The screen of claim 8, wherein each of the refraction prism and the total internal reflection prism comprises a first angle and a second angle with respect to a central line of the prism, and the first angle and the second angle change based on the incident angles of the light.

14. The screen of claim 1, wherein the second angle satisfies a condition of $\theta_2 \le \alpha_1$, where $\theta_2$ is the second angle, and $\alpha_1$ is a first incident angle of the light with respect to a normal line of the screen, and wherein when the condition is satisfied, there is minimized an amount of the light which is incident onto the first Fresnel lens surface but is blocked by the second Fresnel lens surface.

15. The screen of claim 1, wherein the Fresnel lens sheet and the lenticular lens sheet are adjacent to each other without any other intervening components.

* * * * *